United States Patent Office 2,934,470
Patented Apr. 26, 1960

2,934,470
INSECTICIDAL PERCHLOROCARBON

John T. Rucker, Lewiston, N.Y., assignor to Hooker Chemical Corporation, Niagara Falls, N.Y., a corporation of New York No Drawing. Original application June 27, 1955, Serial No. 518,349. Divided and this application March 31, 1958, Serial No. 727,515

4 Claims. (Cl. 167—30)

This invention relates to a new chemical compound composed of carbon and chlorine, having an empirical formula of $C_{10}Cl_{10}$. More particularly, this invention relates to a new chemical compound bis-(pentachlorocyclopentadienyl) having an empirical formula $C_{10}Cl_{10}$ and a melting point of about 120 to 122 degrees centigrade.

The compound of this invention may be prepared by reductive coupling of hexachlorocyclopentadiene by hydrogen in the presence of a noble metal of group VIII having an atomic weight greater than 43 as a catalyst, with or without a solvent, at a temperature above about 20 degrees centigrade.

In preparing the compound of this invention, presumably in accordance with the following equation:

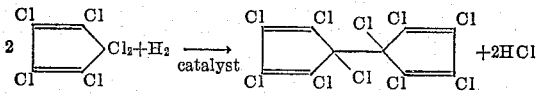

a solvent may or may not be employed; if a solvent is used, it should be inert with respect to the reactants and the reaction products. Among the solvents which may be employed are inexpensive and unreactive materials inert under the conditions employed, such as benzene, toluene, etc.

I have found that the choice of the catalyst is restricted to noble metals in group VIII of the periodic table which have an atomic number greater than 43. These metals are ruthenium, rhodium, palladium, osmium, radium and platinum whose atomic numbers are 44, 45, 45, 76, 77 and 78 respectively. Furthermore, I have found palladium to be the most satisfactory of these catalysts as well as being one of the least expensive of these particular elements. The catalyst to be used in the method of this invention is most effective when it is deposited on an inert carrier such as activated alumina, activated charcoal or kieselguhr preferably in a finely divided state. The amount of group VIII noble metal deposited on the carrier may be varied within wide ranges without materially effecting the reaction. I prefer to use as a carrier of powdered charcoal with palladium deposited therein in the amount of about 5 percent by weight. After treatment of the product the catalyst on the inert carrier or deposited catalyst is removed by hot filtration. Such deposited catalysts are available in commercial forms ranging from 1 to 20 percent of a noble metal deposited on the inert carrier. The concentration of the catalyst to be used during the reductive coupling may be varied in wide ranges without materially effecting the reaction; in general the catalytic amount is all that is required. Catalyst concentrations containing about 0.001 to about 0.5 percent by weight of the metal based on the weight of the starting material have been found to be effective. When desirable, deposited catalyst concentrations as high as 10 percent may be used without detrimental effect except perhaps, on economy. I have also found the catalyst may be re-used many times with very little reduction in its activity. Further, I have found that when the catalyst finally does lose a substantial amount of its activity, it can be reactivated by washing and heating to a dull redness under an inert atmosphere.

It is preferred to perform the reaction at approximately room temperature. Lowering the temperature of the reaction increases operaitonal costs such as cooling; whereas this increased cost is not compensated by increased yields. Elevated reaction temperatures only serve to increase the yield of by-products.

The compound of this invention is useful as a chemical intermediate, for example, $C_{10}Cl_{10}$ may be chlorinated to produce $C_{10}Cl_{12}$ having a melting point of 221 to 223 degrees centigrade as more fully described hereinafter, which material is disclosed and claimed in copending application filed of even date herewith in the name of Earl T. McBee and James D. Idol, Jr. Further, $C_{10}Cl_{10}$ may be thermally dechlorinated to produce $C_{10}Cl_8$. Still further, $C_{10}Cl_{10}$ is useful as an insecticide as exemplified hereinafter.

EXAMPLE 1

Preparation

Twenty grams of hexachlorocyclopentadiene and one gram of catalyst consisting of 5 percent palladium-on-carbon powder, were charged into a two liter round bottom flask equipped with a thermometer, a reflux condenser, and a heating or cooling means. Gaseous hydrogen was bubbled into the mixture with stirring at a temperature of 30 to 40 degrees centigrade. The effluent gases were scrubbed with water to remove any hydrogen chloride evolved. After six hours, one mole of hydrogen chloride was evolved for every four moles of hexachlorocyclopentadiene charged and the reaction was stopped. The catalyst was removed by filtration at a temperature of 28 degrees centigrade. The resultant black filtrate was cooled to 12 degrees centigrade, then 5.8 grams of the white crystalline product (30% by weight) was separated by filtration. The product was recrystallized from isopropyl alcohol and then from hexane to give 5.6 grams of odorless crystals (28%). These crystals were analyzed and found to possess a melting point of about 120 to 122 degrees centigrade, a chlorine content of 74.2 percent by weight, a molecular weight of 460; which corresponds to $C_{10}Cl_{10}$, having a theoretical chlorine content of 74.60 percent by weight, and a theoretical molecular weight of 475, respectively.

EXAMPLE 2

The method of Example 1 was repeated except that 20 grams of hexachlorocyclopentadiene was dissolved in toluene in the presence of a palladium-on-carbon catalyst. The product was recovered as in Example 1 and contained 5.9 grams of odorless crystals. These crystals were admixed with the product of Example 1 and showed no depression of melting point.

EXAMPLE 3

Use as chemical intermediate

Five grams of $C_{10}Cl_{10}$ prepared as in Example 1 (0.01 mole) was sealed in a Carius tube at minus 194 degrees centigrade with 10 grams (0.28 mole) of chlorine. The tube was heated in a furnace at 200 degrees centigrade for twelve hours. After cooling the tube was chilled to minus 194 degrees centigrade, opened, and the excess chlorine allowed to evaporate. The residue was recrystallized from benzene giving 4 grams (75%) of $C_{10}Cl_{12}$ as colorless needles, melting point of 221 to 223 degrees centigrade. $C_{10}Cl_{12}$ is disclosed in copending application filed of even date herewith in the name of Earl T. McBee and James D. Idol, Jr.

EXAMPLE 4

Use as chemical intermediate

A solution of 50 grams of $C_{10}Cl_{10}$ prepared as in Example 1 in 200 milliliters of carbon tetrachloride was placed in a Vycor tube 50 millimeters in diameter by 250 millimeters long, equipped with a gas dispersion disk, internal cooling coils and a reflux condenser. The tube was irradiated by two fluorescent lamps while chlorine was admitted into the solution for twelve hours while maintaining the temperature at approximately 15 degrees centigrade, after which the solution was recovered from the tube and the solvent evaporated. The residue was dissolved in 150 milliliters of benzene, decolorized with Norite, then filtered. The clear filtrate was heated to remove benzene which resulted in the formation of colorless needle-like crystals. These colorless crystals were analyzed and found to possess a melting point of about 221 to 223 degrees centigrade, a chlorine content of 78.05 and 77.89 percent by weight; a carbon content of 22.12 percent by weight, which corresponds to $C_{10}Cl_{12}$ having a theoretical chlorine content of 77.98 percent by weight and a theoretical carbon content of 22.01 percent by weight.

Four grams of $C_{10}Cl_{12}$ (0.007 mole) prepared as above was dissolved in 100 milliliters of methylene chloride, distilled from anhydrous aluminum chloride. Powdered aluminum chloride (0.5 gram) was added and the mixture was refluxed overnight. A darkened mixture was poured into water which had been made acidic with hydrochloric acid, then the organic layer was separated and washed with water and dried. Evaporation of the solvent left 3.7 grams of very light yellow crystals with a melting point of 485 degrees centigrade. An equal mixture of this product and that prepared as in Example 1, of a copending application filed of even date herewith in the name of Arnold N. Johnson did not result in a depressed melting point.

EXAMPLE 5

Use as chemical intermediate

Twenty grams of $C_{10}Cl_{10}$ prepared as in Example 1 was sealed in a Carius tube evacuated to a pressure of 35 millimeters. The tube was maintained at a temperature of 250 to 270 degrees centigrade for ten hours in an electric furnace, after which it was removed from the furnace, cooled in a Dry Ice bath, opened and the contents extracted with 100 milliliters of chloroform. The resulting slurry was filtered and the filtrate evaporated to dryness leaving 1.5 grams of a crystalline residue. The crystals were recrystallized from carbon disulfide and found to possess a melting point of 344 to 346 degrees centigrade. The original precipitate was recrystallized twice from a 50:50 mixture by volume of benzene and glacial acetic acid. Thirteen grams of solid white crystalline material were recovered representing an overall yield of 85 percent by weight. These white crystals were analyzed and found to possess a melting point of 345 to 347 degrees centigrade, a chlorine content of 70.12 and 70.15 percent by weight which corresponds to $C_{10}Cl_8$ having a theoretical chlorine content of 70.3 percent by weight. $C_{10}Cl_8$ is disclosed in copending application filed of even date herewith in the name of Charles F. Baranauckas.

A 25 percent by weight dust of the perchlorocarbon, $C_{10}Cl_8$, prepared as above, having a melting point of 345 to 347 degrees centigrade was made by intimately mixing the perchlorocarbon with a solid inert carrier, such as talc. This formulation which had the $C_{10}Cl_8$ as the only insecticidal active ingredient product a 100 percent knock-down in a period of twenty-four hours, when applied in a contact knock-down test to the confused flour beetle (*Trbolium confusion*). This indicates the usefulness of the compound as an ingredient in insecticidal compositions, contributing high knock-down quality thereto. The dust is equally effective against other species of insects and this example is not to be construed as limiting the insecticidal usefulness of the compound.

The compound of this invention is capable of being diluted with a solvent, such as benzene, to form solutions or dispersions which are effective against mites, such as *Tetranychus atlanticus*, and *Tetranychus bimaculatus*. This new insecticide may be applied in any of the conventional methods. Thus, for example, it may be used in an aqueous emulsion or it may also be incorporated in organic liquids such as the aromatic hydrocarbons for spraying purposes. It may be effectively used in dusts with such inert solid diluents as kieselguhr, wood flour, walnut shell, talc and the like. More particularly, 0.2 gram of $C_{10}Cl_{10}$, as in Example 1, may be mixed with a solvent, such as benzene, and an emulsifying agent to form an emulsifiable formulation which is then diluted to 200 milliliters with water. The following table shows the kills obtained under comparable conditions for the various dilutions when the sprays were applied to specific mites.

TABLE

| Insect | Percent Dilution | Number of Insects Used | Percent Kill (After 5 days) |
| --- | --- | --- | --- |
| *Tetranychus bimaculatus* | 0.1 | 50 | 100 |
| Do | 0.05 | 49 | 96 |
| *Tetranychus atlanticus* | 0.1 | 50 | 100 |
| Do | 0.05 | 50 | 100 |

It is to be understood that the invention is not limited to the specific examples which have been offered merely as illustration and that modification may be made within the scope of the appended claims without departing from the spirit of the invention.

I claim:

1. A process for protecting material susceptible to attack by insects which comprises applying to said material an effective amount of a perchlorocarbon having the formula

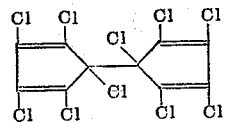

2. A process for protecting material susceptible to attack by insects which comprises applying to said material an effective amount of a perchlorocarbon having the formula

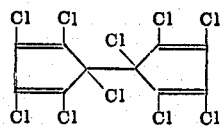

and an inert insecticidal adjuvant as a carrier therefor.

3. A process for destroying insects which comprises exposing the same to a lethal concentration of

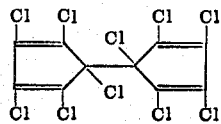

4. A process for destroying insects which comprises exposing the same to a lethal concentration of

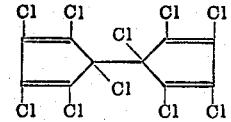

and an inert insecticidal adjuvant as a carrier therefor.

References Cited in the file of this patent

UNITED STATES PATENTS

| | | |
|---|---|---|
| 2,316,962 | Lynn | Apr. 20, 1943 |
| 2,732,409 | Ladd | Jan. 24, 1956 |
| 2,837,579 | Buntin | June 3, 1958 |

OTHER REFERENCES

Hackh: Chem. Dictionary, 3rd ed., 1944, McGraw-Hill, p. 270.

UNITED STATES PATENT OFFICE
CERTIFICATE OF CORRECTION

Patent No. 2,934,470                                         April 26, 1960

John T. Rucker

It is hereby certified that error appears in the printed specification of the above numbered patent requiring correction and that the said Letters Patent should read as corrected below.

Column 2, line 14, for "operaitonal" read -- operational --; line 24, after "Jr." insert -- , which issued August 26, 1959 as US patent number 2,849,499. --; column 3, line 13, after "in" insert -- the aforesaid --; line 52, after "application" insert -- SN 518,340 --; column 4, line 7, after "Charles F. Baranauckas" and before the period insert -- , which issued on July 30, 1957 as US patent number 2,801,269 --; line 13, for "product" read -- produced --; line 59, after "invention." insert the following paragraph:

> This application is a continuing application based upon my copending application Serial No. 518,349, filed June 27, 1955, which issued as US Patent No. 2,908,723 on Oct. 13, 1959.

Signed and sealed this 18th day of April 1961.

(SEAL)
Attest:
ERNEST W. SWIDER
Attesting Officer

DAVID L. LADD
Commissioner of Patents